Figure 3:
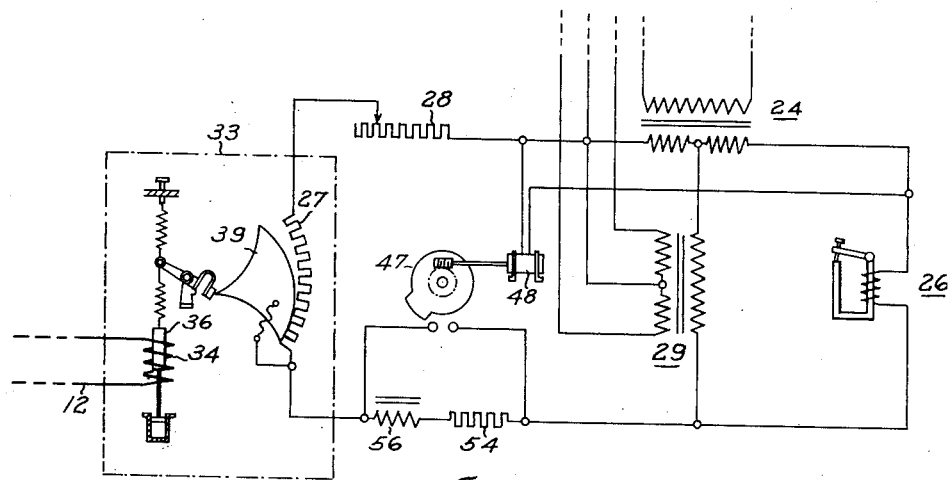

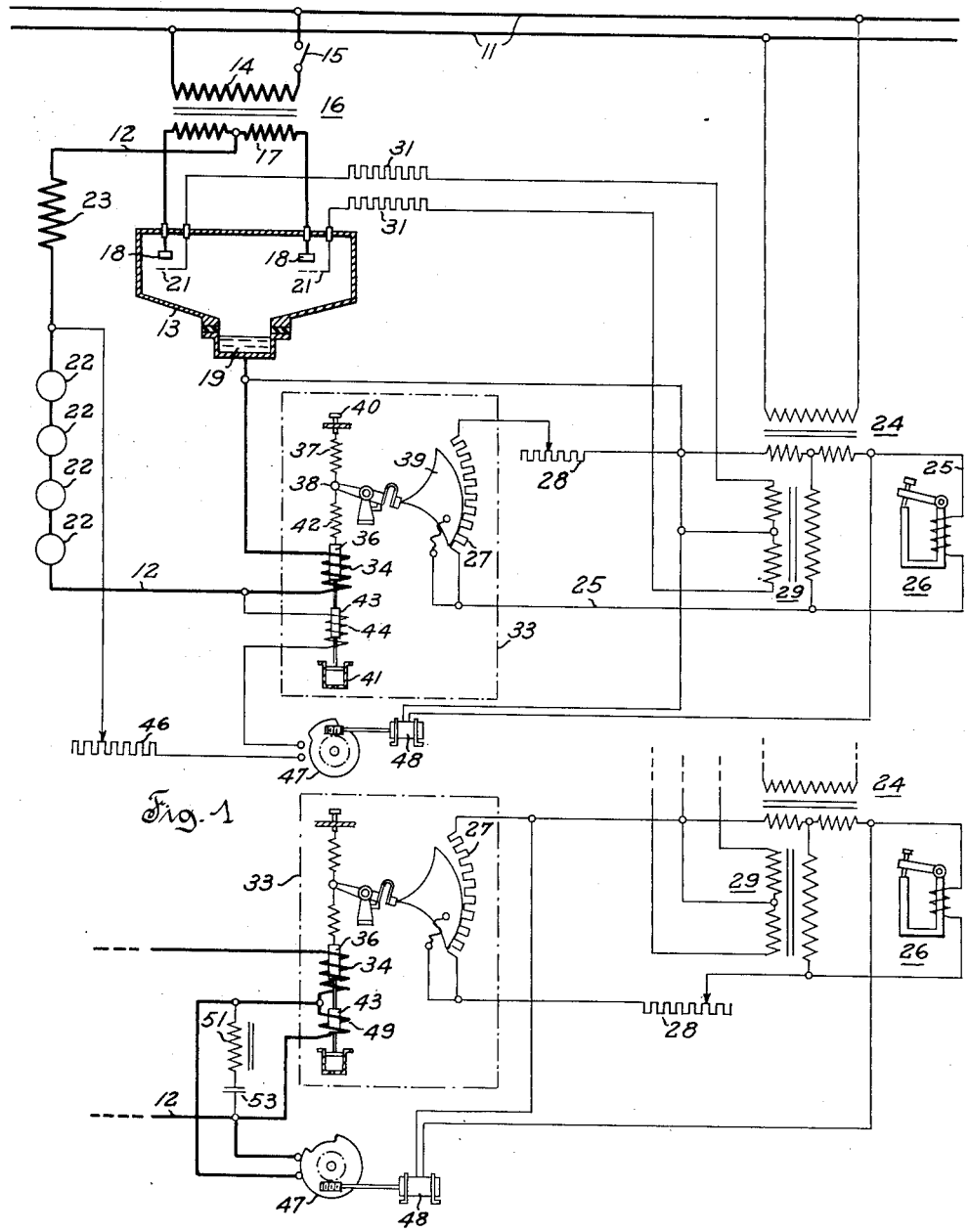

Oct. 5, 1937.   H. WINOGRAD ET AL   2,095,047
ELECTRIC VALVE CONTROL SYSTEM
Filed June 22, 1934   3 Sheets-Sheet 3

Inventors
H. Winograd
P. K. Dortort
by their Attorney

Patented Oct. 5, 1937

2,095,047

UNITED STATES PATENT OFFICE 2,095,047

ELECTRIC VALVE CONTROL SYSTEM

Harold Winograd and Isadore K. Dortort, Milwaukee, Wis., assignors to Allis-Chalmers Manufacturing Company, Milwaukee, Wis., a corporation of Delaware Application June 22, 1934, Serial No. 731,864

17 Claims. (Cl. 175—363)

This invention relates in general to electric valve control systems and more particularly to means for varying the adjustment of the flow of current through a valve supplying a load operable at variable voltages.

Electric valves may be used for controlling the flow of current from a source to a consuming device, the connection therebetween being such that the current may either be simply regulated by the valve, or may be converted into current of a different form which is likewise regulated by the action of the valve. The regulating action of the valve is preferably controlled by a regulator acting on control electrodes of the valve to maintain the output voltage or current thereof at predetermined values. Such control electrodes may be of any suitable type, such as the type controlling the transfer of the discharge from one anode to another anode of the valve, or the type periodically causing ignition of the discharge at the cathode. It is frequently also desired to obtain two or more distinct variations of the controlling action of the valve, and means must then be provided for varying the action of the regulator on the control electrodes. Such requirement is met particularly when the valve supplies current to a series lighting circuit which is to be energized at rated or normal current during the early part of the night, the flow of current being maintained at a reduced value when the full illumination is not required, as during the later part of the night, to thereby reduce the expenditure of electrical energy.

It is therefore one of the objects of the present invention to provide a control system for an electric valve in which the flow of current through the valve is normally regulated at predetermined values.

Another object of the present invention is to provide a control system for an electric valve in which the flow of current is periodically maintained at values differing from the normal value thereof.

Another object of the present invention is to provide a control system for an electric valve in which the flow of current is adjusted to a predetermined value for ranges of the load impedance which are varied at predetermined moments.

Another object of the present invention is to provide a control system for an electric valve in which the responsiveness of the regulator controlling the valve is given recurring variations.

Another object of the present invention is to provide a control system for an electric valve in which the adjustment of the circuit connected with the controlling regulator is cyclically varied.

Figure 4:
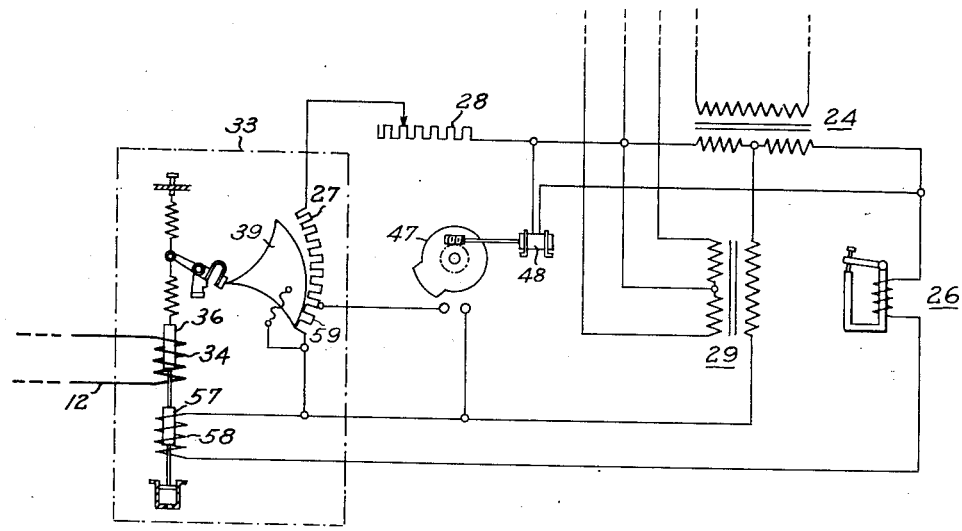
Figure 5:
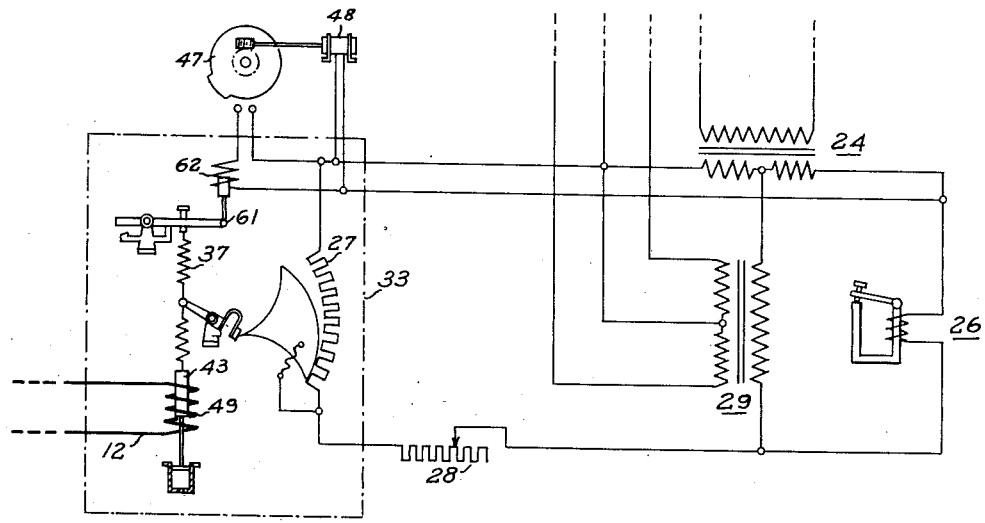

Objects and advantages other than those above described will be apparent from the following description when read in connection with the accompanying drawings, in which:

Fig. 1 diagrammatically illustrates one embodiment of the present invention applied to the control of an electric valve normally supplying a variable voltage constant current load, and in which the controlling regulator is periodically adjusted to regulate the valve current to variable values less than the normal value thereof;

Fig. 2 diagrammatically illustrates a portion of a modified embodiment of the present invention differing from the embodiment illustrated in Fig. 1 in the method of varying the adjustment of the regulator;

Fig. 3 diagrammatically illustrates a portion of another modified embodiment of the present invention in which the regulating range of the regulator is periodically varied by adjustment of the circuit connected with the regulator;

Fig. 4 diagrammatically illustrates a portion of a further modified embodiment of the present invention in which the range of the regulator is varied by short circuiting an active portion of the regulator resistor;

Fig. 5 diagrammatically illustrates a portion of another modified embodiment of the present invention in which the regulator adjustment is periodically modified to thereby alternately regulate the current at two different constant values; and Figs. 6 to 9 are diagrams of the output voltages obtained by means of the embodiments illustrated in Figs. 1 to 5.

Referring more particularly to the drawings by characters of reference, reference numeral 11 designates an alternating current line connected with a direct current line 12 through an electric valve 13. In the present specification it will be assumed that line 11 is utilized as a supply line and line 12 is utilized as an output line connected with current consuming devices receiving current therefrom, but it will be understood that the system hereinafter described may also be used for controlling the conversion of direct current supplied by line 12 into alternating current to be supplied to line 11, or to control any other type of current converting system employing valves. Line 11 is accordingly connected through a switch 15 with the primary winding 14 of a supply transformer 16 having a secondary winding 17 provided with a midtap, the phase portions of winding 17 being severally connected with the anodes 18 of valve 13. Valve 13 may be of any suitable type known in the art and is preferably of the vapor type having a cathode 19 through which the flow of current is controlled by means of control electrodes 21 severally associated with anodes 18. Valve 13 is also provided with the usual discharge igniting and maintaining means which are well known in the art and are, therefore, not shown. If so desired, valve 13 may also be replaced by a plurality of valves each provided with a cathode and with a control electrode operable to recurringly initiate the flow of current between the associated anode and cathode.

Line 12 is connected with cathode 19 and with the midtap of winding 17 and supplies current to suitable current consuming devices such as a plurality of serially connected lamps 22 preferably associated with a reactor 23 connected in series therewith. Control electrodes 21 are preferably energized from line 11 through a transformer 24 having the primary winding thereof connected with line 11 and having a secondary winding provided with a midtap. Such secondary winding supplies current to a circuit 25 comprising a reactor 26 serially connected with a resistor 27 and a rheostat 28. Such circuit may be adjusted by adjustment of the air gap in the core of reactor 26 to vary the inductance thereof, or by adjustment of the rheostat 28 connected in series with resistor 27. The primary winding of another transformer 29 is connected between the midtap of the secondary winding of transformer 24 and the junction point between reactor 26 and resistor 27, the secondary winding of transformer 29 being provided with a midtap connected with cathode 19 and with terminals severally connected with control electrodes 21 through the usual current limiting resistors 31.

Resistor 27 constitutes a part of a regulator 33 provided for the purpose of automatically regulating the value of the current flowing through valve 13. Regulator 33 is provided with a coil 34 connected in series with line 12 and acting on an armature 36 of the regulator against the action of suitable restraining means such as a spring 37. Core 36 and spring 37 cooperate to move a lever 38 pivoted at a fixed point and constituting a variable resilient fulcrum for a conducting sector 39. Sector 39 engages with resistor 27 or with a suitable intermediate arcuate contact member connected therewith to thereby constitute a variable tap for the resistor. The sector is also connected with one end of the resistor and therefore short circuits a variable portion of the resistor in response to the magnitude of the current flowing through coil 34. The effect of coil 34 on lever 38 differs according to the condition of the elements of the system but the several elements, and more particularly of spring 37, are preferably so dimensioned that lever 38 and sector 39 may be maintained in equilibrium by the flow of current of substantially constant value in the coil 34 regardless of the position of armature 36. The tension of the spring 37 may be adjusted by any suitable means such as a thumb screw 40.

To avoid over-travel of the regulator upon change in the value of the current in coil 34, armature 36 is preferably connected with suitable time delay means such as a dashpot 41. When the adjustment of resistor 27 by sector 39 occurs in discrete steps, movement of sector 39 over one step in response to a change in the value of the current in coil 34 may cause a change of opposite sign in the value of such current sufficient to cause the motion of the regulator to be reversed. Such action may be repeated indefinitely, thus causing hunting of the regulator with resulting oscillation in the value of the current regulated thereby. Such hunting is avoided by inserting a spring 42, or equivalent means, between armature 36 and lever 38. In the embodiment illustrated in Fig. 1 regulator 33 is provided with a second armature 43 subjected to the action of a second coil 44 connectible across current consuming devices 22 through a rheostat 46. Such connection is periodically effected during suitable time intervals by a suitable timing mechanism such as a cam switch 47 driven by a synchronous motor 48 energized at constant speed from line 11. It will be understood that coil 44 may also be connected between the two conductors of line 12, but that such change in connection will also modify the operation of the system during closure of switch 47 as previously described.

In operation, the system being connected as shown and line 11 being energized, upon closure of switch 15 anodes 18 are alternately brought to potentials which are positive with respect to the potential of cathode 19 and are thus alternately operable to carry currents which combine at cathode 19 into a pulsating direct current flowing therefrom through line 12 and the consuming devices connected therewith back to winding 17. The flow of current through the anodes is controlled by the action of control electrodes 21 which receive, from transformer 29, alternating voltages of suitable magnitude effective to release the flow of current through the anodes at points in the anode voltage cycle depending on the phase relation between the anode voltages and the control electrode voltages. Regulator 33 being in the position shown, the entire resistor 27 is connected in series with reactor 26 and the voltage impressed on each control electrode 21 lags behind the voltage of associated anode 18 by a minimum angle, as is well known in the art. The flow of current through anode 18 is then released at the earliest possible time in the cycle, which time may be the instant of initiation of the flow of current through the anodes in the absence of control electrodes, if the control electrode circuits are suitably adjusted. As is well known, the output voltage of valve 13 is a pulsating voltage having an average or direct current component and an alternating current component. When such output voltage is controlled by the action of the control electrode, it may present periodic negative portions during which the flow of current is interrupted if the load is not inductive. When the load is inductive as the result of the presence of inductive means such as reactor 23, the flow of current is maintained over the early portions or over the whole of such negative portions to an extent depending upon the relation between the reactance and the resistance of the load circuit. Both the RMS and the average values of the output voltage of valve 13 depend on such relation, and the magnitude of the flow of current through the valve and through the current consuming devices depends on the total impedance of the load circuit instead of depending upon the resistance thereof only.

Figure 6:
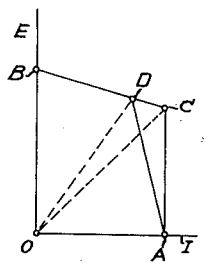

Regulator 33 being in the position shown the tension of the spring 37 is adjusted in such manner that the attraction of coil 34 on armature 36 causes movement of the regulator only when the current through coil 44 reaches a predetermined value represented by distance OA in Fig. 6. If the impedance of the load circuit is above a predetermined value the load current will remain below such value OA and regulator 33 will remain inactive. The flow of current then occurs through each anode 18 at a constant point of the voltage cycle and the RMS output voltage of valve 13 is then represented in function of the load current by line BC in Fig. 6 as is well known in the art.

If the load impedance is decreased below the predetermined value, the current through coil 34 tends to increase beyond value OA and the attraction of coil 34 on armature 36 will overcome the action of spring 37 to vary the point of engagement of sector 39 with resistor 27. The effective value of resistor 27 is thereby decreased with the result that the voltage of transformer 29 is given a corresponding lag. The flow of current through each anode 18 is accordingly released at a later point in the voltage cycle at a reduced output voltage to thereby oppose the increase of the flow of current. Such movement of regulator 33 continues until the flow of current is restored to substantially the value OA regardless of the actual value of the impedance of the load circuit. The output voltage of valve 13 then follows line AC in Fig. 6, being represented by a point of such line depending upon the value of the impedance of the load circuit. Such impedance is represented by the tangent of the angle made by the axis of abscissas with the line joining the origin with the point representing the voltage. Thus the voltage will follow the line AC provided that the load impedance is at values between zero and the tangent of angle AOC, and will follow line BC when the load impedance is between the tangent of angle AOC and infinity.

When the load is non-inductive, and if it is desired to reduce the voltage to the zero value represented by point A in Fig. 6, it is necessary to delay the release of the flow of current through each anode to the end of the voltage half cycle of the anode. When the load circuit is inductive as when the reactor 23 is used, the anode current may be released considerably earlier than the end of the positive voltage cycle, the current then flowing during successive periods of positive voltage and of negative voltage and giving an average zero voltage. Thus when the reactor is used the amount of lag to be given to the voltages of control electrode 21 is greatly reduced, or conversely, the range of regulation obtainable by means of a given regulator may be greatly increased. If it is desired to maintain the current constant even when the load impedance is decreased to zero, the value of resistor 27 must be so chosen that sector 39 need not short circuit the entire resistor when the load impedance still has any material value. In that respect the particular construction of regulator herein illustrated is particularly advantageous in that the resistance of the resistor 27 may be selected at any value as large as desired and may be reduced to zero upon complete short circuiting of the resistor by means of sector 39. Such high variation in the value of the resistor cannot be obtained by means of other regulators known in the art such as the carbon pile regulator.

In street lighting series systems the load is generally constant except for occasional burning out of lamps; the circuits are then preferably so adjusted that the maximum output voltage AC of valve 13 for current OA is only slightly greater than the maximum voltage required for supplying all the lamps, so that the regulating action of the control electrode is reduced to a minimum extent, thereby maintaining the operation of valve 13 at the maximum degree of efficiency and maintaining the power factor of the current drawn from line 11 at a maximum value. Even upon any accidental outage of all the lamps or upon accidental direct short circuit between the conductors of line 12, regulator 33 maintains the flow of current at the value OA, thereby avoiding damage to valve 13 and avoiding disturbances in the operation of line 11.

Such operation is maintained as long as the contacts of switch 47 remain open. At predetermined times and during predetermined time intervals determined by the arrangement of switch 47 the contacts thereof are closed to connect coil 44 across line 12 through rheostat 46. The effect of spring 37 on lever 38 is then maintained in equilibrium by the effect due to the flow of the load current through coil 34 plus an effect in relation with the value of the voltage of line 12 resulting from the flow of current through coil 44. When the load impedance is varied from zero to a value represented by the tangents of angle AOD, regulator 33 adjusts the output voltage of valve 13 at increasing values in such a manner that the current resulting from the impression of such voltage on the load impedance is no longer constant but gradually decreases, whereby the characteristic of the valve follows line AD instead of following line AC in Fig. 6. Under such conditions the voltage of the valve is regulated for a range of load impedances varying from zero to tangent AOD which is different from the range from zero to tangent AOC over which the voltage is regulated during full current operation of the valve. At reduced current, if the load impedance is increased beyond tangent AOD, the voltage is no longer regulated by the regulator and again follows portions BD of line BC. In general such condition would not be obtained and the voltage of valve 13 would be represented by some point of line AD close to point D. The position of point D may be adjusted by adjustment of rheostat 46 to thereby adjust the extent of decrease of the flow of current through the load and the extent of decrease of the illumination given by the lamps. Under the reduced current condition, if one or more of lamps 22 burned out, regulator 33 decreases the output voltage of valve 13 to a value represented by a lower point of line AD, the value of the voltage being such as to cause current to the load to increase and thereby maintain the total illumination of the remaining lamps at substantially the value given by the lamps when all connected in circuit.

In a system connected as above described, valve 13 constitutes means for controlling the flow of current from line 11 and the supply thereof to line 12. The circuit of transformers 24 and 29, reactor 26 and resistor 27 is effective to impress, between each control electrode 21 and cathode 19, a periodic electromotive force effective to control the flow of current through valve 13 and generally differing in phase from the voltage of line 6. Regulator 33 operates in response to an operating condition of valve 13 for controlling the flow of current therethrough, such operating condition being the magnitude of such flow of current. Such regulating action is obtained by varying the adjustment of the circuit of reactor 26 and resistor 27 to thereby control the energization of control electrode 21 and control the flow of current through valve 13 at a substantially constant value. Switch 47 periodically varies the adjustment of regulator 33 and therefore varies the action of such regulator during predetermined time intervals to maintain the flow of current through valve 13 at values lower than the normal value thereof. Such result is obtained by the periodic connection of coil 44 with line 12 whereby the flow of current through valve 13 is alternately regulated to a substantially constant value and to variable values less than such constant value. Rheostat 46 varies the action of coil 44 on regulator 33 to vary the range of variable current values obtained.

In the embodiment illustrated in Fig. 2 armature 43 is under the action of a second current coil 49 serially connected with the first current coil 44 and acting concurrently therewith. Coil 49 is preferably bridged by a circuit operable to divert either the total or the greater part of the alternating component of the flow of current in line 12 from coil 49, leaving only the direct current component of such current in the coil which current has a value equal to the average of the total flow of current. The bridging circuit may comprise a reactor 51 and a capacitor 53 tuned therewith to form a circuit resonant to the frequency of the major alternating component of the current in line 12, but it will be understood that other equivalent means may be utilized and that other circuits may be provided for also removing other alternating current components of the current from coil 49. In general, when the output voltage of valve 13 is reduced to a moderate extent by the action of control electrodes 21 the alternating current voltage component of the output voltage of valve 13 remains small compared to the direct current voltage component thereof so that the output voltage and the current of the valve are not materially affected by the presence of reactor 23 in the load circuit. On the contrary, when the voltage is regulated to a large extent, the alternating component of the voltage increases while the average and RMS values of the voltage decrease so that the ratio between the alternating component and the direct component of the current in line 12 increases in spite of the presence of reactor 23 tending to reduce the magnitude of such alternating component.

Figure 7:
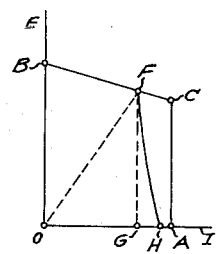

When switch 47 closes the contacts thereof coil 49 is short circuited and the voltage of valve 13 is regulated to follow line AC in Fig. 7 as explained above with respect to the embodiment illustrated in Fig. 1. When switch 47 opens the contacts thereof coil 49 becomes effective and, if the load impedance is at a relatively high value less than tangent AOF in Fig. 7 the alternating component of the flow of current through line 12 is comparatively unimportant and coils 34 and 49 carry substantially the same current. Regulator 33 then tends to maintain the flow of current through line 12 at a substantially constant value OG which is less than OA. When the load impedance decreases, however, the output voltage of valve 13 is decreased to a greater extent by the action of control electrodes 21 and an increasing proportion of the load current forms the alternating component thereof and flows through reactor 51 and capacitor 53, thereby gradually decreasing the effect of coil 49. The flow of current tends to reach the value OA obtained when coil 34 is acting alone and the output voltage of valve 13 then follows curve FH whereby the total illumination is maintained at a substantially constant value even when some of the lamps burn out.

In the embodiment illustrated in Fig. 3 regulator 33 is provided with only the operating coil 34. The connection between resistor 27 and reactor 26 comprises impedance means such as a resistor 54 and a reactor 56. Such impedance means may be short circuited or otherwise disconnected from the circuit by means of switch 47 which serves the same purpose as in the previously described embodiments. The circuits are so adjusted that when the contacts of switch 47 are open, the output voltage of valve 13 again follows lines BC and GH which are reproduced in Fig. 8, the voltage being regulated by the regulator when the load impedance varies from zero to tangent OAC. When the contacts of switch 47 are closed, the circuit will cause control electrodes 21 to receive voltages lagging in phase to an extent corresponding to the values of resistor 54 and reactor 56. Such action is compensated by movement of sector 39 to such an extent that the phase relation between the voltages of anodes 18 and control electrodes 21 which maintain the current at value OA is reestablished. When the regulator reaches the extreme position shown in the drawings, the output voltage of valve 13 will no longer reach the value AC but will be maintained as a smaller value AH. The current through the valve is thus maintained at the previously obtained constant value OA over another range of load impedances from the value zero to the value represented by tangent of angle AOH. If the load impedance increases above the latter value the voltage of the valve is no longer regulated and follows the line HG parallel to line BC as is well known in the art.

The circuits are preferably adjusted in such a manner that the load impedance usually varies between values represented by tangent OAH and tangent OAC so that, during full current operation of the valve, the output voltage of the valve is represented by points on line AC intermediate points C and H and, during reduced current operation resulting from closure of the contacts of switch 47, the voltage is represented by points intermediate points H and K of line HG. Regardless of such operation the regulator is operable to maintain the flow of current through valve 13 at a substantially constant value for a predetermined range of values of the impedance of the load circuit, and periodic closure of contacts of switch 47 periodically modifies the action of the regulator in a manner effective to maintain the flow of current through the valve at the same constant value for another range of values of the impedance of the load circuit.

In the embodiment illustrated in Fig. 4 regulator 33, in addition to controlling the position of sector 39, also controls the position of the core or armature 57 of a reactor 58 to vary the inductance thereof. The coil of the reactor 58 is connected between resistor 27 and reactor 26 whereby, for a given value of resistor 27 and reactor 26, the range of phase angles of the voltages of transformer 29 is increased relatively to the range obtainable by the variation of resistor 27 alone. In addition it has been found that the magnetic attraction of coil 58 on armature 57 has the tendency to stabilize the operation of the regulator. In the present embodiment the contacts of switch 47 are connected across a portion 59 of resistor 27 to permit short circuiting thereof by the switch.

Figure 8:
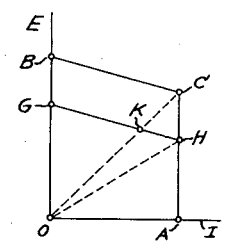

When the contacts of switch 47 are open, regulator 33 operates in the manner explained with respect to the embodiment illustrated in Fig. 1 and the output voltage of valve 13 follows lines BC and CA in Fig. 8. When switch 47 closes the contacts thereof the action of resistor 27 on the control electrode voltages become the same as if sector 39 had moved to short circuit portion 59 of resistor 27 or as when the contacts of switch 47 are closed in the embodiment illustrated in Fig. 3. If the load impedance is greater than a predetermined value such as tangent AOH in Fig. 8, the output voltage of valve 13 is not regulated and follows line GH while the flow of current remains below the value OA. Such current is insufficient for causing movement of armature 36 and sector 39 therefore remains in the position shown. If the load impedance decreases below the value of tangent AOH, the flow of current tends to increase above the value OA and the regulator immediately moves to short circuit a portion of resistor 27 greater than portion 59 thereof to thereby reestablish the flow of current at value OA and to regulate the output voltage of valve 13 along line AH. It will thus be seen that in the present embodiment the action of switch 47 on the characteristics of valve 13 is exactly the same as in the embodiment illustrated in Fig. 3.

In the embodiment illustrated in Fig. 5 spring 37 is no longer attached to a fixed point but is attached to a lever 61 movable to an extent limited by the provision of suitable stops. Lever 61 is maintained engaged against one of the stops under the action of gravity and of the magnetic attraction of coil 49 on armature 43, and may be maintained engaged against the other stop by the action of a solenoid 62 energized from a suitable source such as transformer 24 through the contacts of switch 47, such solenoid being so dimensioned as to overcome the action of gravity and of coil 49 on lever 61.

Figure 9:
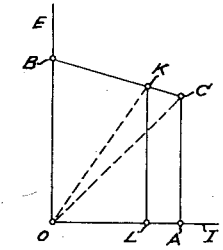

When the contacts of switch 47 are open, the output voltage of valve 13 again follows line BC and CA reproduced in Fig. 9 as above explained with respect to the previously described embodiments. Upon closure of the contacts of switch 47 solenoid 62 attracts lever 61 and increases the tension of spring 37. The setting of regulator 33 is thereby changed to maintain the flow of current in circuit 12 at a substantially constant value OL smaller than the value OA previously obtained. Under such condition the illumination given by the lamps is reduced but if some of the lamps burn out current is maintained constant so that the illumination is no longer maintained at a constant value. In the present embodiment the flow of current is maintained at the reduced constant value for a range of values of the load impedance varying from zero to tangent LOK which is different from the range of values from zero to tangent OAC normally obtaining.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In combination, an alternating current line, a direct current line, an electric valve connected with said lines operable to control the flow of current therebetween and having an anode with an associated control electrode and having a cathode, a circuit including a reactor and a variable resistor connected for impressing an alternating voltage between said control electrode and said cathode differing in phase from the voltage of said alternating current line, a regulator responsive to the magnitude of the flow of current in said valve for varying the adjustment of said circuit to maintain the flow of current through said valve at a substantially constant value, and means for periodically modifying the action of said regulator to cause the flow of current through said valve to occur at other values lower than said constant value.

2. In combination, an alternating current line, a direct current line, current consuming means connected with one of said lines, an electric valve connected with said lines and operable to control the flow of current therebetween and having an anode with an associated control electrode and a cathode, a circuit including a reactor and a variable resistor connected for impressing an alternating voltage between said control electrode and said cathode differing in phase from the voltage of said alternating current line, a regulator responsive to the magnitude of the flow of current in said valve for varying the adjustment of said circuit to maintain the flow of current through said valve at a substantially constant value for a predetermined range of values of the impedance of said current consuming means, and means for periodically modifying the action of said regulator to maintain the flow of current through said valve at said constant value for another range of values of the impedance of said current consuming means.

3. In combination, an alternating current line, a direct current line, current consuming means connected with one of said lines, an electric valve connected with said lines and operable to control the flow of current therebetween and having an anode with an associated control electrode and a cathode, a circuit including a reactor and a variable resistor connected for impressing an alternating voltage between said control electrode and said cathode differing in phase from the voltage of said alternating current line, a regulator for varying the effective value of said resistor and having a current coil serially connected with said current consuming means and a voltage coil connectible across said current consuming means, and means for periodically connecting said voltage coil with said current consuming means whereby the flow of current through said valve is alternately regulated to a substantially constant value and to variable values less than said constant value.

4. In combination, an alternating current line, a direct current line, current consuming means connected with one of said lines, an electric valve connected with said lines and operable to control the flow of current therebetween and having an anode with an associated control electrode and a cathode, a circuit including a reactor and a variable resistor connected for impressing an alternating voltage between said control electrode and said cathode differing in phase from the voltage of said alternating current line, a regulator for varying the effective value of said resistor and having a current coil serially connected with said current consuming means and a voltage coil connectible across said current consuming means, and means for periodically connecting said voltage coil with said current consuming means whereby the flow of current through said valve is alternately regulated to a substantially constant value and to variable values less than said constant value, and means for adjusting the action of said voltage coil on said regulator to thereby vary the range of said variable values.

5. In combination, an alternating current line, a direct current line, an electric valve connected with said lines and operable to control the flow of current therebetween and having an anode with an associated control electrode and a cathode, a circuit including a reactor and a variable resistor connected for impressing an alternating voltage between said control electrode and said cathode differing in phase from the voltage of said alternating current line, a regulator for varying the amount of said resistor in circuit and having a current coil serially connected with said direct current line, and means for diverting from said coil the larger portion of the alternating component of the current flowing through said direct current line whereby the action of said coil on said regulator is made responsive to substantially only the unidirectional component of the current in said direct current line.

6. In combination, an alternating current line, a direct current line, an electric valve connected with said lines and operable to control the flow of current therebetween and having an anode with an associated control electrode and a cathode, a circuit including a reactor and a variable resistor connected for impressing an alternating voltage between said control electrode and said cathode differing in phase from the voltage of said alternating current line, a regulator for varying the connection of said resistor and having a first and a second current coils concurringly acting on said regulator and serially connected in said direct current line whereby said first coil actuates said regulator in response to the root mean square value of the current in said direct current line, means for diverting from said second coil the larger portion of the alternating component of the current in said direct current line whereby said second coil actuates said regulator in response to the average value of the current in said direct current line, and means for periodically short circuiting the said second coil whereby the flow of current through said valve is alternately regulated to a substantially constant value and to variable values less than said constant value.

7. In combination, an alternating current line, a direct current line, an electric valve connected with said lines and operable to control the flow of current therebetween and having an anode with an associated control electrode and a cathode, a circuit including a reactor and a variable resistor connected for impressing an alternating voltage between said control electrode and said cathode differing in phase from the voltage of said alternating current line, a regulator responsive to the magnitude of the flow of current in said valve for varying the adjustment of said circuit, impedance means serially connected with said resistor, and means for short circuiting said impedance means during predetermined recurring time intervals.

8. In combination, an alternating current line, a direct current line, current consuming means connected with one of said lines, an electric valve connected with said lines and operable to control the flow of current therebetween and having an anode with an associated control electrode and a cathode, a circuit including a reactor and a variable resistor and an impedance means connected for impressing an alternating voltage between said control electrode and said cathode differing in phase from the voltage of said alternating current line, a regulator responsive to the magnitude of the flow of current through said valve for varying the adjustment of said circuit to maintain the flow of current through said valve at a substantially constant value for a predetermined range of values of the impedance of said current consuming means, and means for cyclically short circuiting said impedance means to thereby maintain the flow of current through said valve at said constant value for another range of values of the impedance of said current consuming means.

9. In combination, an alternating current line, a direct current line, current consuming means connected with one of said lines, an electric valve connected with said lines and operable to control the flow of current therebetween and having an anode with an associated control electrode and a cathode, a circuit including a reactor and a variable resistor connected for impressing an alternating voltage between said control electrode and said cathode differing in phase from the voltage of said alternating current line, a regulator responsive to the magnitude of the flow of current in said valve for varying the adjustment of said circuit to maintain the flow of current through said valve at a substantially constant value for a predetermined range of values of the impedance of said current consuming means, and means for periodically short circuiting a portion of said resistor to maintain the flow of current through said valve at said constant value for another range of values of the impedance of said current consuming means.

10. In combination, an alternating current line, a direct current line, current consuming means connected with one of said lines, an electric valve connected with said lines and operable to control the flow of current therebetween and having an anode with an associated control electrode and a cathode, a circuit including a reactor and a variable resistor connected for impressing an alternating voltage between said control electrode and said cathode differing in phase from the voltage of said alternating current line, a regulator responsive to the magnitude of the flow of current in said valve for varying the adjustment of said resistor to maintain the flow of current through said valve at a substantially constant value for a predetermined range of values of the impedance of said current consuming means, and means for periodically short circuiting a portion of said resistor to maintain the flow of current through said valve at said constant value for another range of values of the impedance of said current consuming means.

11. In combination, an alternating current line, a direct current line, current consuming means connected with one of said lines, an electric valve connected with said lines and operable to control the flow of current therebetween and having an anode with an associated control electrode and a cathode, a circuit including a reactor and a varible resistor connected for impressing an alternating voltage between said control electrode and said cathode differing in phase from the voltage of said alternating current line, a regulator responsive to the magnitude of the flow of current in said valve for simultaneously modifying the effective values of said resistor and of said reactor to maintain the flow of current through said valve at a substantially constant value for a predetermined range of values of the impedance of said current consuming means, and means for periodically short circuiting a portion of said resistor to maintain the flow of current through said valve at said constant value for another range of values of the impedance of said current consuming means.

12. In combination, an alternating current line, a direct current line, an electric valve connected with said lines and operable to control the flow of current therebetween and having an anode with an associated control electrode and a cathode, a circuit including a reactor and a variable resistor connected for impressing an alternating voltage between said control electrode and said cathode differing in phase from the voltage of said alternating current line, a regulator responsive to the magnitude of the flow of current in said valve for varying the adjustment of said circuit and having restraining means controlling the action thereof to maintain the flow of current through said valve at a substantially constant value, and means for varying the adjustment of said restraining means during predetermined time intervals to thereby maintain the flow of current through said valve at another substantially constant value.

13. In an electric current converting system, the combination with an electric current supply circuit, an electric current load circuit, and means interconnecting said circuits comprising an electric valve having an anode and a cathode constituting spaced electrodes for the flow of current therebetween, of means for controlling said flow of current comprising a control electrode constituting an element of said valve, means for continually applying potential to said control electrode of such sign and magnitude relative to the potential of said cathode and during such moments as to determine the moments of initiation of said flow of current, means operable responsive to an operating condition of said system for affecting the operation of the first said means in such sense as to cause the application of said potential to said control electrode during such moments as to cause the said flow of current to be maintained at a substantially constant value, and means for periodically affecting the operation of the fourth said means in such sense as to cause the application of said potential to said control electrode during such moments as to cause the said current to flow at values other than said constant value.

14. In an electric current converting system, the combination with an electric current supply circuit, an electric current load circuit, and means interconnecting said circuits comprising an electric valve having an anode and a cathode constituting spaced electrodes for the flow of current therebetween, of means for controlling said flow of current comprising a control electrode constituting an element of said valve, means for continually applying potential to said control electrode of such sign and magnitude relative to the potential of said cathode and during such moments as to determine the moments of initiation of said flow of current, means operable responsive to the magnitude of the flow of said current for affecting the operation of the third said means in such sense as to cause the application of said potential to said control electrode during such moments as to cause the said flow of current to be maintained at a substantially constant value, and means for periodically affecting the operation of the fourth said means in such sense as to cause the application of said potential to said control electrode during such moments as to cause the said current to flow at a substantially constant value different from the first said constant value.

15. In an electric current converting system, the combination with an alternating current line, a direct current line, and means interconnecting said lines comprising an electric valve having an anode and a cathode constituting spaced electrodes for the flow of current between said lines, of means for controlling said flow of current comprising a control electrode constituting an element of said valve, means for impressing an alternating voltage between said control electrode and said cathode of such phase and frequency relative to the voltage of said alternating current line as to determine the moments of initiation of said flow of current, means operable responsive to and in dependence on the magnitude of the flow of said current for affecting the operation of the third said means in such sense as to cause such variations of the phase of the said voltage impressed on said control relative to the voltage of said alternating current line as to cause said flow of current to be maintained at a substantially constant value, and means for periodically affecting the fourth said means in such sense as to cause the phase of the said voltage impressed on said control electrode to be varied relative to the voltage of said alternating current line in such sense as to cause the said flow of current to be maintained at a substantially constant value different from the first said constant value.

16. In an electric current converting system, the combination with an electric current supply circuit, a direct current load circuit, and means comprising an electric valve having an anode and a cathode interconnecting said circuits and constituting spaced electrodes for the flow of current therebetween, of means for controlling said flow of current comprising a control electrode constituting an element of said valve, means comprising a source of current for impressing a potential on said control electrode, a regulator for varying said potential relative to the potential of said supply circuit having a coil responsive to the said flow of current, and means for diverting from said coil the larger portion of an alternating component of the said current flowing through said load circuit, whereby the action of said coil is made responsive to substantially only the unidirectional component of the current of said load circuit.

17. In an electric current converting system, the combination with an alternating current supply circuit, a direct current load circuit, and means comprising an electric valve having an anode and a cathode interconnecting said circuits and constituting spaced electrodes for the flow of current therebetween, of means for controlling said flow of current comprising a control electrode constituting an element of said valve, means for impressing an alternating voltage between said cathode and control electrode, a regulator comprising a coil responsive to the flow of current in said direct current circuit for controlling the phase of the said alternating voltage relative to the phase of the voltage of said supply circuit, and means for diverting from said coil the larger portion of the alternating component of the current flowing through said load circuit, whereby the action of said coil is made responsive to substantially only the unidirectional component of the current of said load circuit.

HAROLD WINOGRAD.
ISADORE K. DORTORT.